United States Patent
Liang et al.

(10) Patent No.: US 9,918,353 B2
(45) Date of Patent: Mar. 13, 2018

(54) 802.1X ACCESS SESSION KEEPALIVE METHOD, DEVICE, AND SYSTEM

(71) Applicant: ZTE CORPORATION, Shenzhen, Guangdong (CN)

(72) Inventors: Qiandeng Liang, Shenzhen (CN); Liang Fan, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 14/766,053

(22) PCT Filed: Sep. 17, 2013

(86) PCT No.: PCT/CN2013/083699
§ 371 (c)(1),
(2) Date: Aug. 5, 2015

(87) PCT Pub. No.: WO2014/127630
PCT Pub. Date: Aug. 28, 2014

(65) Prior Publication Data
US 2015/0382397 A1  Dec. 31, 2015

(30) Foreign Application Priority Data
Feb. 19, 2013 (CN) .......................... 2013 1 0053064

(51) Int. Cl.
*H04L 29/08* (2006.01)
*H04W 76/04* (2009.01)
(Continued)

(52) U.S. Cl.
CPC ......... *H04W 76/045* (2013.01); *H04L 67/142* (2013.01); *H04L 69/28* (2013.01);
(Continued)

(58) Field of Classification Search
CPC . H04W 76/045; H04W 76/028; H04W 12/06; H04W 84/12; H04L 67/142; H04L 69/28
See application file for complete search history.

(56) References Cited

U.S. PATENT DOCUMENTS 8,520,540 B1 * 8/2013 Foschiano ........... H04L 43/0852
370/252
2004/0214576 A1 * 10/2004 Myers ................. H04L 63/0272
455/445

(Continued)

FOREIGN PATENT DOCUMENTS

CN         1447570 A       10/2003
CN         1476207 A       2/2004

(Continued)

OTHER PUBLICATIONS

International Search Report in international application No. PCT/CN2013/083699, dated Dec. 26, 2013.

(Continued)

*Primary Examiner* — Andrew Lai
*Assistant Examiner* — Chuong M Nguyen
(74) *Attorney, Agent, or Firm* — LeClairRyan, a Professional Corporation (57) ABSTRACT

The present invention relates to the field of communications. Disclosed are an 802.1X access session keepalive method, device, and system. The method comprises: during network access of a 802.1X client, an authenticating node used for access authentication sending, to the 802.1X client according to an actual keepalive period of the authenticating node, a keepalive request message used for determining whether the 802.1X client is off-net abnormally; and during a preset duration of the authenticating node, if the authenticating node does not receive a keepalive response message from the 802.1X client in response to the keepalive request message, the authenticating node determining that the (Continued)

802.1X client is off-net abnormally; otherwise, determining that the 802.1X client is on-net normally. The embodiments of the present invention improve network resource utilization, reduce the security problem caused by too heavy load of the authenticating node, and lower the risk of errors in charging on time.

16 Claims, 6 Drawing Sheets

(51) Int. Cl.
*H04L 29/06* (2006.01)
*H04W 12/06* (2009.01)
*H04W 76/02* (2009.01)
*H04W 84/12* (2009.01)

(52) U.S. Cl.
CPC ......... *H04W 12/06* (2013.01); *H04W 76/028* (2013.01); *H04W 84/12* (2013.01)

(56) References Cited

U.S. PATENT DOCUMENTS

| | | | | |
|---|---|---|---|---|
| 2005/0080921 | A1* | 4/2005 | Lu | H04L 63/08 709/237 |
| 2005/0223111 | A1* | 10/2005 | Bhandaru | H04L 12/4604 709/236 |
| 2007/0286217 | A1* | 12/2007 | Miyata | H04L 12/5692 370/401 |
| 2008/0076420 | A1 | 3/2008 | Khetawat | |
| 2008/0101396 | A1* | 5/2008 | Miyata | H04L 12/66 370/408 |
| 2009/0064281 | A1* | 3/2009 | Esaka | H04L 63/08 726/3 |
| 2009/0262682 | A1 | 10/2009 | Khetawat | |
| 2009/0262683 | A1 | 10/2009 | Khetawat | |
| 2009/0262684 | A1 | 10/2009 | Khetawat | |
| 2009/0262702 | A1 | 10/2009 | Khetawat | |
| 2009/0262703 | A1 | 10/2009 | Khetawat | |
| 2009/0262704 | A1 | 10/2009 | Khetawat | |
| 2009/0264095 | A1 | 10/2009 | Khetawat | |
| 2009/0264126 | A1 | 10/2009 | Khetawat | |
| 2009/0265542 | A1 | 10/2009 | Khetawat | |
| 2009/0265543 | A1 | 10/2009 | Khetawat | |
| 2010/0217882 | A1* | 8/2010 | Yang | H04L 12/4633 709/229 |
| 2011/0296044 | A1* | 12/2011 | Weis | H04L 43/0811 709/230 |
| 2012/0110324 | A1 | 5/2012 | Geng | |
| 2014/0169338 | A1* | 6/2014 | Bajko | H04W 72/042 370/336 |

FOREIGN PATENT DOCUMENTS

| | | |
|---|---|---|
| CN | 1652538 A | 8/2005 |
| CN | 1747439 A | 3/2006 |
| CN | 1787434 A | 6/2006 |
| CN | 1866900 A | 11/2006 |
| CN | 1881938 A | 12/2006 |
| CN | 1980235 A | 6/2007 |
| CN | 101047502 A | 10/2007 |
| CN | 101127673 A | 2/2008 |
| CN | 101141448 A | 3/2008 |
| CN | 101232372 A | 7/2008 |
| CN | 101309215 A | 11/2008 |
| CN | 101345683 A | 1/2009 |
| CN | 101360020 A | 2/2009 |
| CN | 101494580 A | 7/2009 |
| CN | 101547131 A | 9/2009 |
| CN | 101651596 A | 2/2010 |
| CN | 101790164 A | 7/2010 |
| CN | 101834867 A | 9/2010 |
| CN | 101883038 A | 11/2010 |
| CN | 101999223 A | 3/2011 |
| CN | 101999224 A | 3/2011 |
| CN | 102006236 A | 4/2011 |
| CN | 102055636 A | 5/2011 |
| CN | 102075938 A | 5/2011 |
| CN | 102404720 A | 4/2012 |
| CN | 102487348 A | 6/2012 |
| CN | 103200172 A | 7/2013 |
| EP | 2432265 A1 | 3/2012 |
| RU | 2160924 C1 | 12/2000 |
| WO | 2009129516 A1 | 10/2009 |

OTHER PUBLICATIONS

English Translation of the Written Opinion of the International Search Authority in international application No. PCT/CN2013/083699, dated Dec. 26, 2013.
Supplementary European Search Report in European for corresponding International Patent Application No. 13875702.6 (dated Dec. 22, 2015).
Russia Office Action for Application No. 2015136853/08(056364), dated Jan. 18, 2017.
China Office Action for Application No. 201310053064.3, dated Feb. 13, 2017.

* cited by examiner

```
EAPOL-Start-Announcement message format:
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Version   |      1        |     Length    |  | Field of 1 for EAPOL definition for EAPOL-Start-
Announcement message type
+-+-+-+-+-+-+-+-+-+-+-+-+-+-+-+-+-+-+-+-+-+-+-+-+-+-+-+-+-+-+-+-+   --------------------------
|   Request   |                                |  | field of 1 for Request
+-+-+-+-+-+-+-+-+-+                             +  --------------------------
|         Tag, Length, Value (TLV)             | |
~                                              ~ | TLV option
|                                              | |
+-+-+-+-+-+-+-+-+-+-+-+-+-+-+-+-+-+-+-+-+-+-+-+-+-+-+-+-+-+-+-+-+   --------------------------
EAPoL-Ammouncement-Req message format:
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Version   |      8        |     Length    |  |Field of 8 for EAPoL definition for EAPoL-
Ammouncement-Req message type
+-+-+-+-+-+-+-+-+-+-+-+-+-+-+-+-+-+-+-+-+-+-+-+-+-+-+-+-+-+-+-+-+   --------------------------
|                                              | |
~              TLVs                            ~ | TLV option
|                                              | |
+-+-+-+-+-+-+-+-+-+-+-+-+-+-+-+-+-+-+-+-+-+-+-+-+-+-+-+-+-+-+-+-+   --------------------------

0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| TLV Type )  |  TLV Length   |               |  | TLV option format defined by 802.1X protocol
+-+-+-+-+-+-+-+-+-+-+-+-+-+-+-+                  |
|              TLVs                             |
~                                               ~
|                                               |
+-+-+-+-+-+-+-+-+-+-+-+-+-+-+-+-+-+-+-+-+-+-+-+-+-+-+-+-+-+-+-+-+

Recommended format for new extended OPTION_KEEPALIVE_PARAMETERS, with TLV Type of 110:
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    110      |      4        |   Reserved    |   IsEnable    |  |
+-+-+-+-+-+-+-+-+-+-+-+-+-+-+-+-+-+-+-+-+-+-+-+-+-+-+-+-+-+-+-+-+
|    Period           |                       |
+-+-+-+-+-+-+-+-+-+-+-+-+-+-+-+-+
```

Figs. 7 recommended extended EAPoL-Keepalive message format

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Version    |  Packet Type  |      Packet Body Length        |
+-+-+-+-+-+-+-+-+-+-+-+-+-+-+-+-+-+-+-+-+-+-+-+-+-+-+-+-+-+-+-+-+
| Message Type |  Forced Flag  |        Timer Period            |
+-+-+-+-+-+-+-+-+-+-+-+-+-+-+-+-+-+-+-+-+-+-+-+-+-+-+-+-+-+-+-+-+
|                        Sequence number                        |
+-+-+-+-+-+-+-+-+-+-+-+-+-+-+-+-+-+-+-+-+-+-+-+-+-+-+-+-+-+-+-+-+
```

802.1X ACCESS SESSION KEEPALIVE METHOD, DEVICE, AND SYSTEM

This application is a national stage application under 35 U.S.C. § 371 from PCT Application No. PCT/CN2013/083699, filed Sep. 17, 2013, which claims the priority benefit of China Application No. 201310053064.3, filed Feb 19, 2013.

TECHNICAL FIELD

The disclosure relates to the field of communication, and in particular to a method, device, and system for keeping an access session alive based on an 802.1X protocol.

BACKGROUND

With rapid development of Internet applications and smart terminals, application of Wireless Local Area Networks (WLAN) has become very common. WLAN have been deployed in many public places, such as a factory, a school, a café, and/or the like. Web access through WLAN has become one of the most important means for a subscriber to access network resources. A subscriber may access the Internet to perform an activity such as online business or entertainment anywhere anytime through various terminal devices such as a mobile phone, a computer, and/or the like. With a constant increasing public demand for Internet access through WLAN anywhere anytime, the government and operators have introduced projects for constructing public WLAN hot spots and hot zones. Wide-range WLAN coverage has been achieved in some cities in areas including business centers, universities and institutes, and the like, which further increases a frequency of a terminal subscriber using the WLAN, such that at the same time a number of online WLAN terminals increases rapidly.

At present, network access by a WLAN subscriber is mainly control in modes including a 802.1X mode and via a Dynamic Host Configuration Protocol (DHCP) subscriber option 60, network authentication, and the like. No such mode considers, in initial design, a scene of simultaneous WLAN access by very large scale subscribers, in which case such access modes share a common defect of failing to sense in time whether an online subscriber loses connection to the network abnormally, i.e., providing no mechanism for keeping a subscriber state alive or up-to-date. A subscriber may often lose connection abnormally for various reasons, without sending a disconnected message to an access control device. For a WLAN hot zone, with a lot of subscribers constantly accessing the WLAN and leaving the WLAN with no announcement to a WLAN device, a network device at a WLAN control layer may have to manage a constantly increasing number of online subscribers, such that the network device at the WLAN control layer, particularly a subscriber authenticating and managing device (i.e., a gateway device) may become loaded gradually, leading to resource waste and a certain security risk.

Use of 802.1X+EAP in WLAN subscriber access has become increasingly common, particularly as a main mode in a WLAN access scene for authentication without subscriber awareness. A subscriber normally may perform access, be authenticated, and acquire addresses of three layers by 802.1X+Extensible Authentication Protocol (EAP)+Dynamic Host Configuration Protocol release 4/Dynamic Host Configuration Protocol release 6 (DHCPv4/DHCPv6), 802.1X+EAP+static Internet Protocol (Static IP)/StateLess Address Auto Configuration (SLAAC). No Keeplive mechanism exists for the access protocol between a subscriber and an authenticating node /gateway device, such that upon a link error or once a subscriber loses connection abnormally, the authenticating node /gateway device cannot detect in time that the subscriber has been disconnected, thereby impacting accuracy of subscriber billing and consuming memory resources of the authenticating node /gateway device. Although the authenticating node /gateway device may detect whether a subscriber loses connection to the network abnormally by subscriber connection detection through supplementary means such as a unicast Address Resolution Protocol (ARP) request or idle subscriber traffic detection, such methods are irrelevant to the access protocol 802.1X, and may require additional protocol enablement, and in general consume more resources, impacting performance of the authenticating node /gateway device.

To sum up, no prior solution exists for issues such as waste of the authenticating node resources, a security risk, and/or a billing error caused by a lot of subscribers leaving a network without sending a disconnected message according to related art.

SUMMARY

Embodiments herein provide a method, device, and system for keeping an access session alive, for confirming and maintaining a state of an online subscriber, capable of solving issues such as waste of the authenticating node resources, a security risk, and/or a billing error caused by a lot of subscribers leaving a network without sending a disconnected message.

According to an aspect of an embodiment herein, a method for keeping an 802.1X access session alive may include:

while an 802.1X client is connected to a network, sending, by an authenticating node for access authentication according to a Keeplive period of the authenticating node, the 802.1X client an Extensible Authentication Protocol over LAN (EAPOL)-Keeplive request for determining whether the 802.1X client loses connection to the network abnormally;

when the authenticating node receives, within a predetermined period of time at the authenticating node, no Keeplive response sent by the 802.1X client in response to the EAPOL-Keeplive request sent by the authenticating node to the 802.1X client, determining, by the authenticating node, that the 802.1X client loses connection to the network abnormally; otherwise when the authenticating node receives, within the predetermined period of time at the authenticating node, a Keeplive response sent by the 802.1X client in response to the EAPOL-Keeplive request sent by the authenticating node to the 802.1X client, determining, by the authenticating node, that the 802.1X client is connected to the network.

The method may further include:

while the 802.1X client is connected to the network, sending, by the 802.1X client according to a Keeplive period of the 802.1X client, the authenticating node an EAPOL-Keeplive request for determining whether the authenticating node is in an abnormal state;

when the 802.1X client receives, within a predetermined period of time at the 802.1X client, no Keeplive response sent by the authenticating node in response to the EAPOL-Keeplive request sent by the 802.1X client to the authenticating node, determining, by the 802.1X client, that the authenticating node is in an abnormal state; otherwise when the 802.1X client receives, within the predetermined period of time at the 802.1X client, a Keeplive response sent by the authenticating node in response to the EAPOL-Keeplive request sent by the 802.1X client to the authenticating node, determining that the authenticating node is in a normal state.

The method may further include: before sending, by the authenticating node /the 802.1X client, the 802.1X client /the authenticating node the EAPOL-Keeplive request, receiving, by the authenticating node, an EAPOL-Start-Announcement request sent by the 802.1X client, and sending the 802.1X client an EAPOL-EAP-Request-Identity message;

receiving, by the authenticating node, an EAPOL-EAP-Response-Identity message sent by the 802.1X client in response to the EAPOL-EAP-Request-Identity message, packing the EAPOL-EAP-Response-Identity message into an Access-Request, and sending the Access-Request to an authenticating server;

determining, by the authenticating server with the 802.1X client through the authenticating node, an authentication mode according to the Access-Request, and authenticating the 802.1X client according to the authentication mode;

packing, by the authenticating server, an authentication-succeeds/fails result into an access-granted/refused message, and sending the access-granted/refused message to the authenticating node.

During access authentication of the 802.1X client, when the EAPOL-Start-Announcement request sent by the 802.1X client includes no recommended Keeplive period, the 802.1X client may pack a recommended Keeplive period into an announcement request, and send the announcement request to the authenticating node, such that the authenticating node may determine the Keeplive period of the authenticating node.

The authenticating node may acquire an authorization attribute for activating a Keeplive option in the received access-granted message by resolving the received access-granted message, and activate, according to the authorization attribute for activating the Keeplive option, a Keeplive option of an 802.1X client corresponding to a specified identity or service manage domain identifier, such that an 802.1X access session may be kept alive.

The authenticating node may determine the Keeplive period of the authenticating node by:

resolving the received EAPOL-Start-Announcement request or the received announcement request, and acquiring the recommended Keeplive period in the resolved message;

resolving the received access-granted message, and acquiring an authorized Keeplive period in the resolved access-granted message; and determining the Keeplive period of the authenticating node using the recommended Keeplive period and/or the authorized Keeplive period and/or a local Keeplive period configured locally at the authenticating node.

The Keeplive period of the 802.1X client may be a default Keeplive period local to the 802.1X client.

The 802.1X client may acquire a forced Keeplive period in the Keeplive response received by the 802.1X client by resolving the Keeplive response received by the 802.1X client. The 802.1X client may adjust the Keeplive period of the 802.1X client according to the forced Keeplive period.

According to another aspect of an embodiment herein, a system for keeping an 802.1X access session alive may include an 802.1 client and an authenticating node for access authentication.

The authenticating node may be configured for: while the 802.1X client is connected to a network, sending, according to a Keeplive period of the authenticating node, the 802.1X client an Extensible Authentication Protocol over LAN (EAPOL)-Keeplive request for determining whether the 802.1X client loses connection to the network abnormally; when the authenticating node receives, within a predetermined period of time at the authenticating node, no Keeplive response sent by the 802.1X client in response to the EAPOL-Keeplive request sent by the authenticating node to the 802.1X client, determining that the 802.1X client loses connection to the network abnormally; otherwise when the authenticating node receives, within the predetermined period of time at the authenticating node, a Keeplive response sent by the 802.1X client in response to the EAPOL-Keeplive request sent by the authenticating node to the 802.1X client, determining that the 802.1X client is connected to the network.

The 802.1X client may be configured for: while the 802.1X client is connected to the network, sending, according to a Keeplive period of the 802.1X client, the authenticating node an EAPOL-Keeplive request for determining whether the authenticating node is in an abnormal state; when the 802.1X client receives, within a predetermined period of time at the 802.1X client, no Keeplive response sent by the authenticating node in response to the EAPOL-Keeplive request sent by the 802.1X client to the authenticating node, determining that the authenticating node is in an abnormal state; otherwise when the 802.1X client receives, within the predetermined period of time at the 802.1X client, a Keeplive response sent by the authenticating node in response to the EAPOL-Keeplive request sent by the 802.1X client to the authenticating node, determining that the authenticating node is in a normal state.

The system may further include an authenticating server.

The authenticating node may be further configured for: before the authenticating node /the 802.1X client sends the 802.1X client /the authenticating node the EAPOL-Keeplive request, receiving an EAPOL-Start-Announcement request sent by the 802.1X client, and sending the 802.1X client an EAPOL-EAP-Request-Identity message; receiving an EAPOL-EAP-Response-Identity message sent by the 802.1X client in response to the EAPOL-EAP-Request-Identity message, packing the EAPOL-EAP-Response-Identity message into an Access-Request, and sending the Access-Request to the authenticating server.

The authenticating server may be configured for: determining an authentication mode with the 802.1X client through the authenticating node according to the Access-Request, and authenticating the 802.1X client according to the authentication mode; packing an authentication-succeeds/fails result into an access-granted/refused message, and sending the access-granted/refused message to the authenticating node.

The 802.1X client may be further configured for: during access authentication of the 802.1X client, when the EAPOL-Start-Announcement request sent by the 802.1X client includes no recommended Keeplive period, packing a recommended Keeplive period into an announcement request, and sending the announcement request to the authenticating node, such that the authenticating node determines the Keeplive period of the authenticating node.

The authenticating node may be further configured for: acquiring an authorization attribute for activating a Keeplive option in the received access-granted message by resolving the received access-granted message, and activating, according to the authorization attribute for activating the Keeplive option, a Keeplive option of an 802.1X client corresponding to a specified identity or service manage domain identifier, such that an 802.1X access session may be kept alive.

The authenticating node may be further configured for: resolving the received EAPOL-Start-Announcement request or the received announcement request, and acquiring the recommended Keeplive period in the resolved message;

resolving the received access-granted message, and acquiring an authorized Keeplive period in the resolved access-granted message; and determining the Keeplive period of the authenticating node using the recommended Keeplive period and/or the authorized Keeplive period and/or a local Keeplive period configured locally at the authenticating node.

The Keeplive period of the 802.1X client may be a default Keeplive period local to the 802.1X client.

The 802.1X client may be further configured for: acquiring, by resolving the Keeplive response received by the 802.1X client, a forced Keeplive period in the Keeplive response received by the 802.1X client, and adjusting the Keeplive period of the 802.1X client according to the forced Keeplive period.

According to an aspect of an embodiment herein, an authenticating node may include. an authenticating node messaging module configured for: while an 802.1X client is connected to a network, sending, according to a Keeplive period of the authenticating node, the 802.1X client an Extensible Authentication Protocol over LAN (EAPOL)-Keeplive request for determining whether the 802.1X client loses connection to the network abnormally;

a client state determining module configured for: when the authenticating node receives, within a predetermined period of time at the authenticating node, no Keeplive response sent by the 802.1X client in response to the EAPOL-Keeplive request sent by the authenticating node to the 802.1X client, determining that the 802.1X client loses connection to the network abnormally; otherwise when the authenticating node receives, within the predetermined period of time at the authenticating node, a Keeplive response sent by the 802.1X client in response to the EAPOL-Keeplive request sent by the authenticating node to the 802.1X client, determining that the 802.1X client is connected to the network.

According to an aspect of an embodiment herein, an 802.1 client may include:

a client messaging module configured for: while the 802.1X client is connected to the network, sending, according to a Keeplive period of the 802.1X client, an authenticating node an Extensible Authentication Protocol over LAN (EAPOL)-Keeplive request for determining whether the authenticating node is in an abnormal state;

an authenticating node state determining module configured for: when the 802.1X client receives, within a predetermined period of time at the 802.1X client, no Keeplive response sent by the authenticating node in response to the EAPOL-Keeplive request sent to the authenticating node, determining that the authenticating node is in an abnormal state; otherwise when the 802.1X client receives, within the predetermined period of time at the 802.1X client, a Keeplive response sent by the authenticating node in response to the EAPOL-Keeplive request sent to the authenticating node, determining that the authenticating node is in a normal state.

Compared with the related art, beneficial effects of an embodiment herein are as follows.

1, according to an embodiment herein, by performing Keeplive over an 802.1X client, an authenticating node may sense in time whether a subscriber loses connection to a network abnormally, thereby enhancing a rate of utilizing resources of a network, in particular a WLAN access network. Implementation herein is handy, and can be extended flexibly.

2, with an embodiment herein, a risk of an error in time and billing and security issues of overloading an authenticating node configured for access authentication may be reduced.

3, with an embodiment herein, by performing Keeplive over an authenticating node, an 802.1X client may sense in time a state of the authenticating node, and select in time another effective note when the authenticating node state goes abnormal, thereby enhancing subscriber experience.

DETAILED DESCRIPTION

Embodiments herein are elaborated below with reference to the drawings. Note that the embodiments described below are merely for describing and explaining the disclosure instead of limiting the disclosure.

According to an embodiment herein, given that in existing WLAN a device directly performing 802.1X message exchange with a client may be an 802.1X authenticating node, and an authenticating flow may be triggered by an Extensible Authentication Protocol over LAN (EAPOL) message, an EAPOL message may be extended, implementing a bidirectional Keeplive mechanism between the client and the authenticating node. Such a mechanism may equally apply to subscriber access authentication with an 802.1X client in a wired access network. The EAPOL may refer to the EAP borne on a local area network, i.e., an 802.1X protocol.

Figure 1:
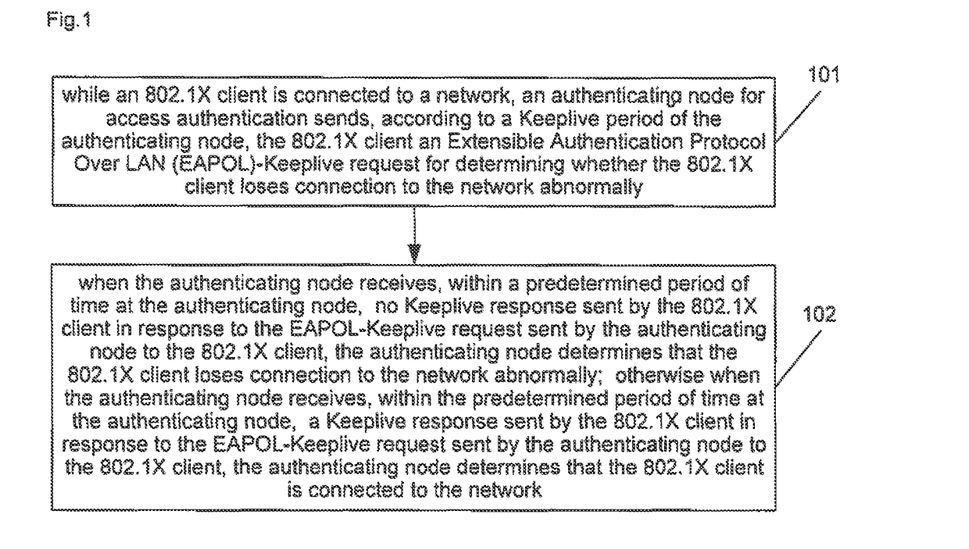
FIG. 1 is a block diagram of a method for keeping an 802.1X access session alive according to an embodiment herein.

FIG. 1 is a block diagram of a method for keeping an 802.1X access session alive according to an embodiment herein. As shown in FIG. 1, the method may include steps as follows.

In step 101, while an 802.1X client is connected to a network, an authenticating node for access authentication sends, according to a Keeplive period of the authenticating node, the 802.1X client an Extensible Authentication Protocol over LAN (EAPOL)-Keeplive request for determining whether the 802.1X client loses connection to the network abnormally.

In step 102, when the authenticating node receives, within a predetermined period of time at the authenticating node, no Keeplive response sent by the 802.1X client in response to the EAPOL-Keeplive request sent by the authenticating node to the 802.1X client, the authenticating node determines that the 802.1X client loses connection to the network abnormally; otherwise when the authenticating node receives, within the predetermined period of time at the authenticating node, a Keeplive response sent by the 802.1X client in response to the EAPOL-Keeplive request sent by the authenticating node to the 802.1X client, the authenticating node determines that the 802.1X client is connected to the network.

Besides the steps 101 and 102, the method may further include steps as follows. While the 802.1X client is connected to the network, the 802.1X client may send, according to a Keeplive period of the 802.1X client, the authenticating node an EAPOL-Keeplive request for determining whether the authenticating node is in an abnormal state. When the 802.1X client receives, within a predetermined period of time at the 802.1X client, no Keeplive response sent by the authenticating node in response to the EAPOL-Keeplive request sent by the 802.1X client to the authenticating node, the 802.1X client may determine that the authenticating node is in an abnormal state. When the 802.1X client receives, within the predetermined period of time at the 802.1X client, a Keeplive response sent by the authenticating node in response to the EAPOL-Keeplive request sent by the 802.1X client to the authenticating node, the 802.1X client may determine that the authenticating node is in a normal state.

That is, a Keeplive mechanism between an 802.1X client and an authenticating node may be established, such that any interacting party in an 802.1X protocol session can effectively sense in time whether an opposite party is abnormal. For example, in the steps 101 and 102, the authenticating node may sense that the 802.1X client loses connection abnormally using a Keeplive mechanism.

Figure 2:
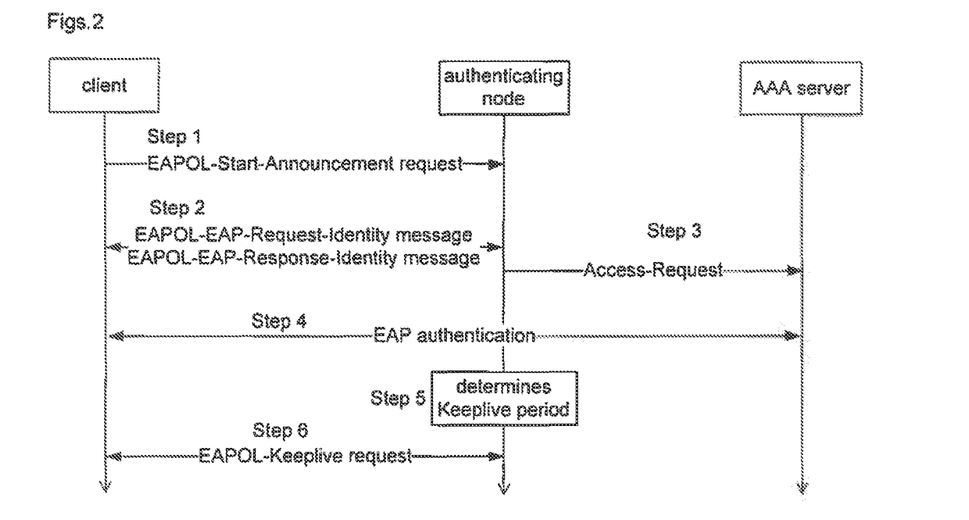
FIG. 2 is a flowchart of a method for keeping an 802.1X access session alive according to an embodiment herein.

FIG. 2 is a flowchart of a method for keeping an 802.1X access session alive according to an embodiment herein. As shown in FIG. 2, the method may include steps as follows.

Figure 6:
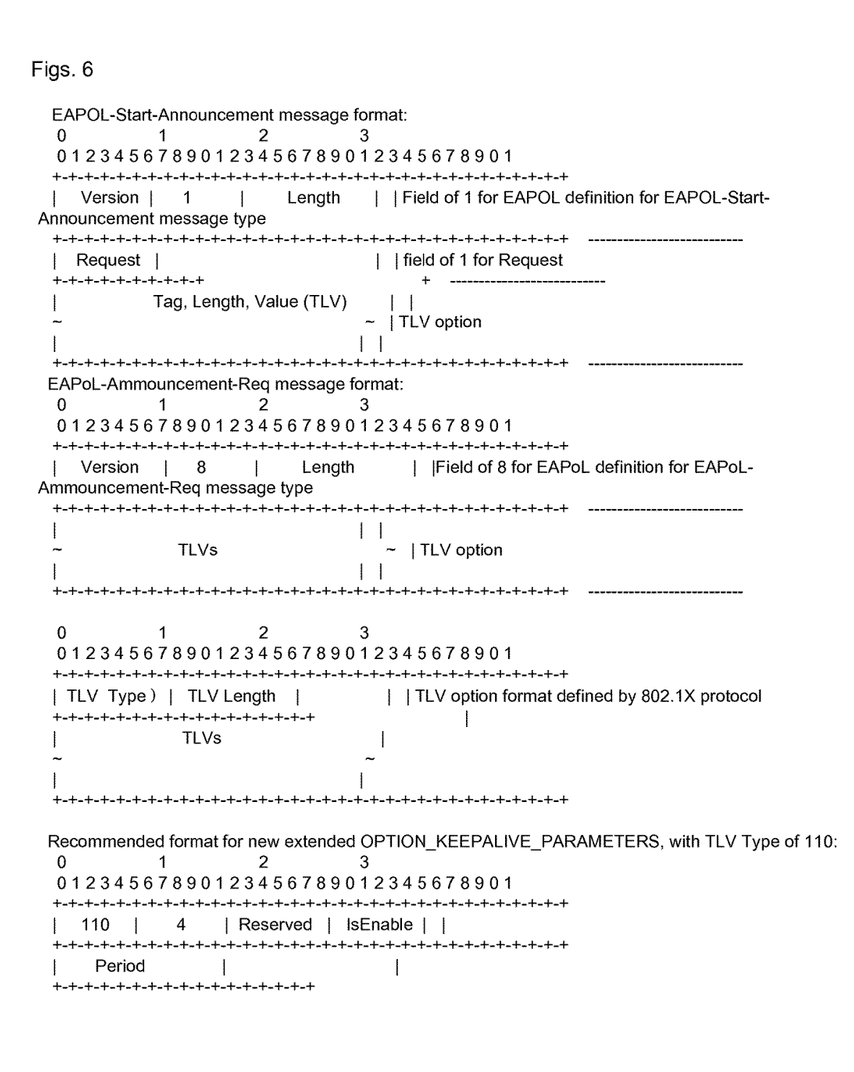
FIG. 6 is a diagram of an extended Start-Announcement message according to an embodiment herein.

In step 1, an 802.1X station STA may send an EAPOL-Start-Announcement request to an authenticating node for access authentication. An extended Tag, Length, Value (TLV) option of the EAPOL-Start-Announcement message may include information on a Keeplive enabling identifier and a recommended Keeplive period. A format of the extended TLV option is as shown in FIG. 6, where Reserved may identify a reserved field, of 0 by default; IsEnable may be a Keeplive enabling label, of 0 for disabled or of 1 for enabled; Period may be a recommended Keeplive period, with a Period value of 0 for invalid, a Period value of 65535 for Keeplive-disabled, and any other value as an effective value.

In step 2, the authenticating node may save information on the recommended Keeplive period recommended by the STA, and may send an EAPOL-EAP-Request-Identity message to the STA, asking for authentication information. Upon receiving the EAPOL-EAP-Request-Identity message, the STA may return, to the authenticating node, an EAPOL-EAP-Response-Identity message.

In step 3, the authenticating node may include the EAPOL-EAP-Response-Identity message in an Access-Request message and send the Access-Request message to an authenticating server, i.e., an Authentication, Authorization, Accounting (AAA) server.

In step 4, the AAA server may negotiate an authentication mode with the STA through the authenticating node, and authenticate the STA. An authentication result may be sent to the authenticating node using an EAP-Success or EAP-Failure message.

The EAP-Success or EAP-Failure message may be packed into an access-granted/refused message, and sent to the authenticating node.

An EAP authentication protocol between the STA and the AAA server may include an EAP-PEAP, an EAP-SIM, an EAP-AKA, an EAP-TLS, and an EAP-TTLS.

An authenticating protocol between the authenticating node and the AAA server may include a Radius, a Diameter, and/or the like.

In step 5, the authenticating node may comprehensively determine a Keeplive period of the authenticating node for the STA according to the recommended Keeplive period recommended by the STA, a local Keeplive period configured locally at the authenticating node, and/or an authorized Keeplive period the AAA server authorizes for the STA.

By default, the authorized Keeplive period sent by the AAA server may be of a highest priority. The local Keeplive period configured locally at the authenticating node may be of a second-highest priority. The recommended Keeplive period recommended by the STA may be of a lowest priority. Such a priority sequence may be adjusted according to a configured strategy.

That is, during a Keeplive/state-update operation performed by an authenticating node over an 802.1X client, three parties of an 802.1X authentication model (i.e., the 802.1X client, the authenticating node, and the authenticating server) may be allowed to take part in negotiating a Keeplive period for an 802.1X protocol session. The authenticating node may finally determine the effective Keeplive period of the authenticating node according to a configured selection strategy. Keeplive may be performed over an 802.1X protocol session according to the determined Keeplive period of the authenticating node. As long as allowed by the three parties of the 802.1X authentication model, the authenticating node may be allowed to dynamically adjust a Keeplive period for an 802.1X session according to a circumstance such as a load of the authenticating node, or the like.

In step 6, the authenticating node may send, according to the Keeplive period of the authenticating node for the STA, the STA an Eapol-Keeplive request. Upon receiving such a message, the STA may return a Keeplive response.

The EAPOL-Keeplive request and Keeplive response may be referred to collectively as an EAPOL-Keeplive message, including fields as follows, where Protocol Version, may be a protocol version (EAPOL), which may take a length of 1 byte, or a length of 3 in a latest release number;

Packet Type, may be an EAPOL message type, recommended to be 0xf for an EAPOL-Keepalive message, which may take a length of 1 byte;

Packet Body Length, may be a message length, which may have a length of 2 bytes;

Message Type, may be an EAPOL-Keepalive message type, which may take a length of 1 byte, with 0 denoting an EAPOL-Keeplive request Echo request, and 1 denoting a Keeplive response Echo reply;

Forced Flag, may be of 1 byte, indicating whether an opposite end is forced to modify a Keeplive period of the opposite end as an effective Keeplive period recommended by a local end. By default, an opposite end is not forced to do so.

Timer Period, may be a Keeplive period, which may take a length of 2 bytes, with 0 indicating invalid, 65535 indicating Keeplive-disabled, or any other value as an effective value, with a recommended value of 180 seconds;

Sequence number, may be a sequence number, which may take a length of 4 bytes, identifying a group of EAPOL-Keeplive request and reply, with a random initial value. When an EAPOL-Keeplive request is re-sent due to expiration of a reply, a sequence number thereof may remain the same. When a new EAPOL-Keeplive request is sent, a sequence number thereof may increase progressively.

In the flow, an EAPOL-Start-Announcement may send no such information as whether Keeplive is enabled at the STA and/or a recommended Keeplive period to the authenticating node. The STA may separately send, in authentication, the authenticating node an EAPOL-Announcement-Req including such information, as long as the authenticating node learns in time whether Keeplive is enabled at the STA and the recommended Keeplive period before the STA is authenticated. That is, during access authentication of an 802.1X client, the 802.1X client may include a corresponding extended option in the EAPOL-Start-Announcement or the EAPOL-Announcement-Req, notifying the authenticating node of information such as a recommended Keeplive period recommended by the 802.1X client. When the 802.1X client is successfully authenticated, the authenticating server may distribute information such as an authorized Keeplive period authorized by the authenticating server to the authenticating node in the access-granted message using an extended authorization attribute. The authenticating node may be for a local Keeplive period configured local to a subscriber of a specified manage domain or a specified identity. Upon receiving the access-granted message sent by the authenticating server, the authenticating node may select, from such Keeplive periods according to a locally configured selection strategy, a Keeplive period as the Keeplive period of the authenticating node, and may start message exchange for keeping an 802.1X protocol session alive.

The steps may be for the Keeplive operation performed over the STA by the authenticating node. An STA may also perform Keeplive over an authenticating node, which may be an option, recommended deactivated in general. An authenticating node may have to be able to respond to an EAPOL-Keeplive request by an STA. The STA may initiate an EAPOL-Keeplive request to the authenticating node using a client default Keeplive period of the client, and receive a new forced Keeplive period in a Keeplive response sent by the authenticating node. That is, for Keeplive performed over an authenticating node by an 802.1X client, the authenticating node may be allowed to recommend or force the 802.1X client to adjust a Keeplive period of the 802.1X client according to a result of negotiation among the three parties of the 802.1X authentication model. A forced Keeplive period used as the Keeplive period of the client may be sent to the 802.1X client in a Keeplive response.

It may be seen that after an 802.1X client access is authenticated successfully, the 802.1X client and/or the authenticating node may send an opposite end device of an 802.1X protocol session an EAPOL-Keeplive request; the opposite end device of the 802.1X protocol session may respond with a Keeplive response. The same flow may be repeated in a certain Keeplive period of the client and/or the authenticating node. Such a Keeplive mechanism may be bidirectional, and may be activated or deactivated in a single direction. For example, only Keeplive/state-update behavior performed by an authenticating node over an 802.1X client may be activated, i.e., the authenticating node may send an EAPOL-Keeplive request, and a corresponding 802.1X client may respond with a Keeplive response.

Activation or deactivation of a Keeplive mechanism may be independent of an 802.1X access authentication flow, and may be executed only after an 802.1X client is authenticated successfully. The authenticating node may activate or deactivate a Keeplive option of an 802.1X client with a specified identity or domain identifier. Such an identity may be information such as a subscriber Media Access Control (MAC) address, a subscriber account, or an International Mobile Subscriber Identity (IMSI). Such a domain identifier may be a domain name of a service manage domain of the authenticating node or the authenticating server for a group of subscribers. The authenticating node may activate or deactivate a Keeplive option for such a specified subscriber. An 802.1X client may state whether a Keeplive option is enabled (by including a corresponding extended option in an EAPOL-Start-Announcement request or announcement request, notifying the authenticating node whether a Keeplive option is enabled; an authenticating node may assume by default that an 802.1X client disables the Keeplive option). When enabled, it may be selected whether to activate the Keeplive option. The authenticating server may decide, according to a strategy configured per se, subscribers for which Keeplive may be performed. Upon success of 802.1X client access authentication, the authenticating server may send an authenticating node a corresponding authorization attribute for activating the Keeplive option through an access-granted message. The authenticating node may activate or deactivate the Keeplive option.

Such an 802.1X STA may refer to an 802.1X client and may be a computed equipped with a wireless network card or a smartphone with a Wireless Fidelity (WiFi) module. An STA may be mobile or fixed, and may be a basic constituent unit of the WLAN .

Figure 3:
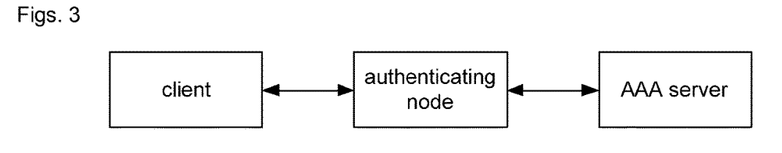
FIG. 3 is a diagram of a system for keeping an 802.1X access session alive according to an embodiment herein.

FIG. 3 is a diagram of a system for keeping an 802.1X access session alive according to an embodiment herein. As shown in FIG. 3, the system may include an authenticating node and an 802.1X client. The system may further include an authenticating server.

The authenticating node may be in charge of: during access authentication of the 802.1X client, selecting an authenticating server and converting authentication message exchange relaying the 802.1X client and the authenticating server; receiving a Keeplive recommendation of the 802.1X client and an authorization attribute of the authenticating server (which may include authorization of a parameter related to Keeplive directed at the 802.1X client), and selecting a proper Keeplive period finally when the 802.1X client is successfully authenticated, and starting Keeplive over the 802.1X client.

The 802.1X client may be in charge of: 802.1X protocol access authentication interaction; actively reporting, according to configuration, a parameter related to the Keeplive option (including whether Keeplive is enabled, a recommended Keeplive period, or the like); after being authenticated successfully, responding to an EAPOL-Keeplive request sent by the authenticating node. If necessary, the 802.1X client may perform Keeplive actively over the authenticating node as configured by sending an EAPOL-Keeplive request and receiving a Keeplive response sent by the authenticating node.

The authenticating server may be in charge of: interaction for EAP authentication of the 802.1X client and distributing an authorization attribute; upon successful authentication, distributing, according to a strategy known per se, a parameter related to Keeplive directed at the 802.1X client to the authenticating node.

The authenticating node may include:

an authenticating node messaging module configured for: while an 802.1X client is connected to a network, sending, according to a Keeplive period of the authenticating node, the 802.1X client an Extensible Authentication Protocol over LAN (EAPOL)-Keeplive request for determining whether the 802.1X client loses connection to the network abnormally;

a client state determining module configured for: when the authenticating node receives, within a predetermined period of time at the authenticating node, no Keeplive response sent by the 802.1X client in response to the EAPOL-Keeplive request sent by the authenticating node to the 802.1X client, determining that the 802.1X client loses connection to the network abnormally; otherwise when the authenticating node receives, within the predetermined period of time at the authenticating node, a Keeplive response sent by the 802.1X client in response to the EAPOL-Keeplive request sent by the authenticating node to the 802.1X client, determining that the 802.1X client is connected to the network.

In real application, both the authenticating node messaging module and the client state determining module may implemented by a Central Processing Unit (CPU), a Digital Signal Processor (DSP), or a Field Programmable Gate Array (FPGA) in the authenticating node.

The 802.1 client may include:

a client messaging module configured for: while the 802.1X client is connected to the network, sending, according to a Keeplive period of the 802.1X client, an authenticating node an Extensible Authentication Protocol over LAN (EAPOL)-Keeplive request for determining whether the authenticating node is in an abnormal state;

an authenticating node state determining module configured for: when the 802.1X client receives, within a predetermined period of time at the 802.1X client, no Keeplive response sent by the authenticating node in response to the EAPOL-Keeplive request sent to the authenticating node, determining that the authenticating node is in an abnormal state; otherwise when the 802.1X client receives, within the predetermined period of time at the 802.1X client, a Keeplive response sent by the authenticating node in response to the EAPOL-Keeplive request sent to the authenticating node, determining that the authenticating node is in a normal state.

In real application, both the client messaging module and the authenticating node state determining module may be implemented by a CPU, a DSP, or an FPGA in the 802.1 client.

Description below focuses on Keeplive/state-update performed by an authenticating node over an 802.1X client, with reference to FIG. 4 to FIG. 11.

Figure 4:
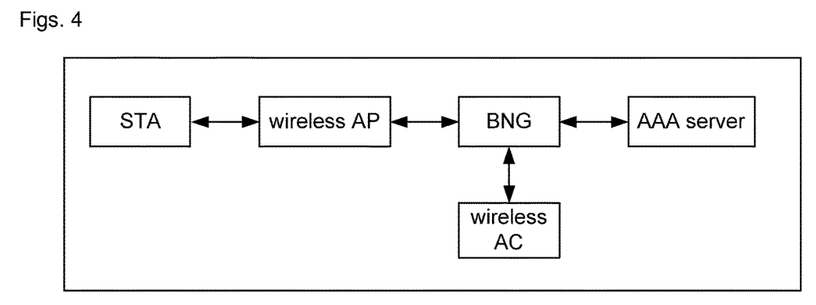
FIG. 4 is a topological diagram of a system for keeping an 802.1X access session alive according to a first embodiment herein.

FIG. 4 is a topological diagram of a system for keeping an 802.1X access session alive according to a first embodiment herein. As shown in FIG. 4, in a scene with a Broad Network Gateway (BNG) serving as an authenticating node, a wireless Access Point (AP) is in a local forward mode, and the BNG communicates with an AAA server using a remote subscriber dial authenticating system Radius protocol. In such a scene, a wireless access controller (AC) may be integrated with or separated from the BNG.

Figure 5:
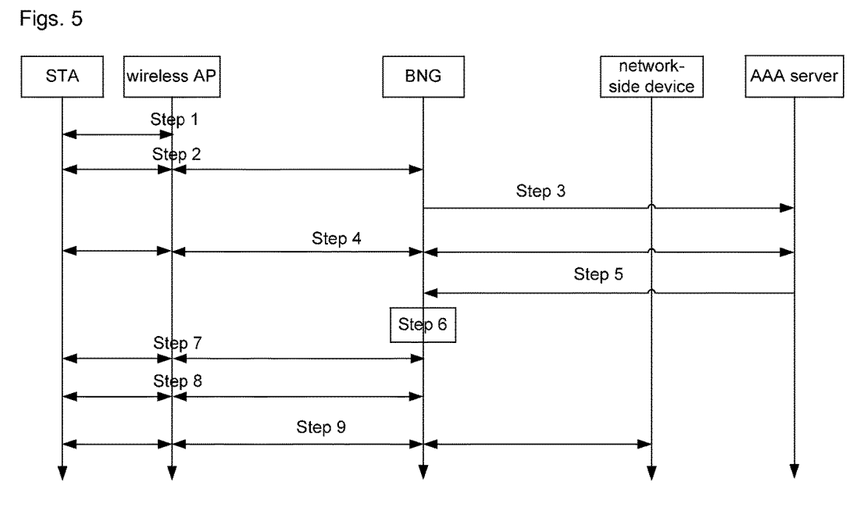
FIG. 5 is a flowchart of a method for keeping an 802.1X access session alive according to a first embodiment herein.

FIG. 5 is a flowchart of a method for keeping an 802.1X access session alive according to the first embodiment herein. The flowchart of the system in FIG. 4 may include steps as follows.

In step 1, after an STA is associated with an AP, information on a Keeplive enabling identifier and a recommended Keeplive period may be included in an extended EAPOL-Start-Announcement message. Such a message may be sent, via the AP, to a BNG.

A diagram of the extended EAPOL-Start-Announcement message is shown in FIG. 6.

The information on the Keeplive enabling identifier may be configured for indicating whether a Keeplive option is enabled.

In step 2, after receiving the EAPOL-Start-Announcement message sent by the STA, the BNG may extract therefrom, and save, the information on the recommended Keeplive period recommended by the STA; and send, through the AP, the STA an EAPOL-EAP-Request-Identity message. Upon receiving the EAPOL-EAP-Request-Identity message, the STA may send, through the AP, the BNG an EAPOL-EAP-Response-Identity message.

In step 3, the BNG may pack the EAPOL-EAP-Response in a RADIUS protocol Access-Request, and send the Access-Request to an AAA server.

In step 4, the AAA server may negotiate an authentication mode with the STA. The AAA server may authenticate the STA.

In step 5, the AAA server may send the BNG an EAP-SUCCESS message indicating successful authentication or an EAP-FAILURE message indicating failed authentication packed in an Access-Accept/Reject message of a RADIUS protocol message.

If subscription information of a subscriber includes information on an authorized Keeplive period, the AAA server may send the BNG such information in the Access-Accept message.

In step 6, the BNG may determine, according to information on the recommended Keeplive period recommended by the STA, a local Keeplive period locally configured as well as the authorized Keeplive period sent by the AAA server, a Keeplive period of the authenticating node for the authenticating node to perform Keeplive over the STA.

Figure 7:
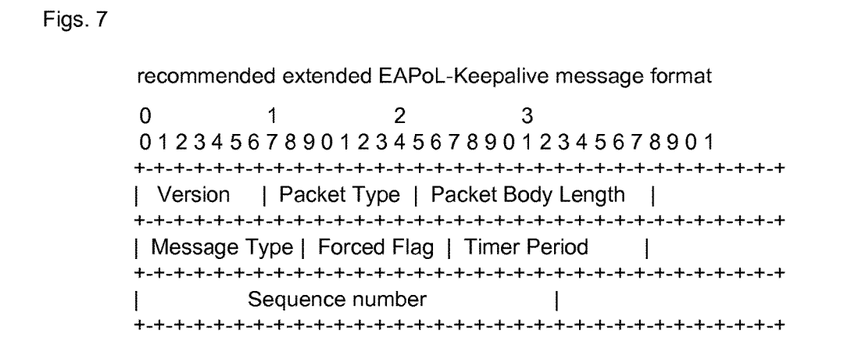
FIG. 7 is a diagram of an EAPOL-Keeplive request according to an embodiment herein.

In step 7, the BNG may send, according to the Keeplive period of the authenticating node, the STA an EAPOL-Keeplive request. Upon receiving such a message, the STA may return a Keeplive response. A recommended format of the EAPOL-Keeplive request and Keeplive response may be as shown in FIG. 7.

In step 8, the STA may send out a DHCP Discover message requesting an IP address to the BNG through the AP. STA IP address allocation may be achieved between the BNG and the STA through the DHCP protocol. Optionally, the BNG may serve as a DHCP Relay/Proxy and achieve the address allocation flow in place of a DHCP Server.

Particularly, the step 8 forms no specific time sequence with the steps 1 to 7.

In step 9, the BNG may determine that the STA has been authenticated successfully, and allow forwarding uplink and/or downlink data for the STA to access a network-side device.

Figure 8:
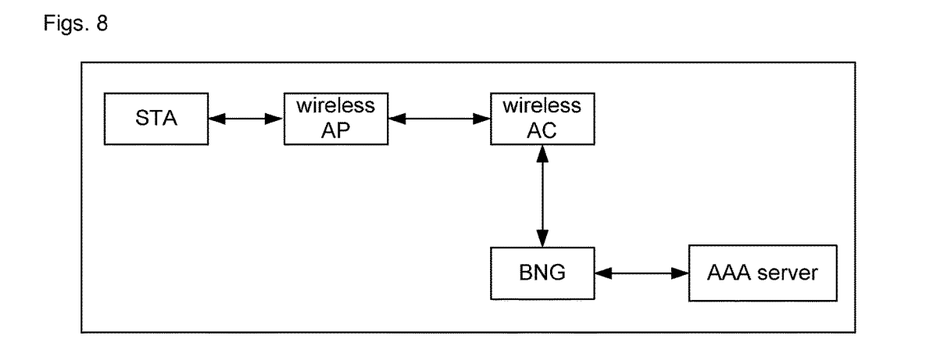
FIG. 8 is a topological diagram of a system for keeping an 802.1X access session alive according to a second embodiment herein.
Figure 9:
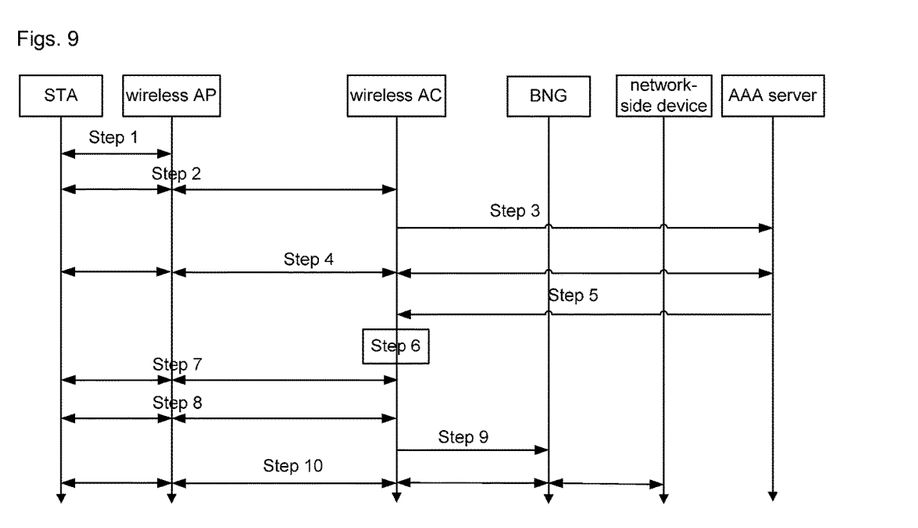
FIG. 9 is a flowchart of a method for keeping an 802.1X access session alive according to a second embodiment herein.

FIG. 8 is a topological diagram of a system for keeping an 802.1X access session alive according to a second embodiment herein. As shown in FIG. 8, compared with the first embodiment, the second embodiment is of a scene where an AC serves as an authenticating node. The AC is connected to an AAA server through a BNG. A flow as shown in FIG. 9 may include steps as follows.

In step 1, after an STA is associated with an AP, information on a Keeplive enabling identifier and a recommended Keeplive period may be included in an extended EAPOL-Start-Announcement message. Such a message may be sent, via the AP, to an AC.

A diagram of the extended EAPOL-Start-Announcement message is shown in FIG. 6.

In step 2, after receiving the EAPOL-Start-Announcement message sent by the STA, the AC may extract therefrom, and save, the information on the recommended Keeplive period recommended by the STA; and send, through the AP, the STA an EAPOL-EAP-Request-Identity message. Upon receiving the EAPOL-EAP-Request-Identity message, the STA may send, through the AP, the AC an EAPOL-EAP-Response-Identity message.

In step 3, the AC may pack the EAPOL-EAP-Response-Identity message in a RADIUS protocol Access-Request, and send the Access-Request to an AAA server.

When a BNG serves as a Radius Proxy network element between the AC and the AAA, the BNG may have to re-pack a Radius protocol message.

In step 4, the AAA server may negotiate an authentication mode with the STA. The AAA server may authenticate the STA.

In step 5, the AAA server may send the AC an EAP-SUCCESS message indicating successful authentication or an EAP-FAILURE message indicating failed authentication packed in an Access-Accept/Reject message of a RADIUS protocol message.

If subscription information of a subscriber includes information on an authorized Keeplive period, the AAA server may send the AC such information in the Access-Accept message.

In step 6, the AC may determine, according to information on the recommended Keeplive period recommended by the STA, a local Keeplive period locally configured as well as the authorized Keeplive period sent by the AAA server, a Keeplive period of the authenticating node for the authenticating node to perform Keeplive over the STA.

In step 7, the AC may send, according to the Keeplive period of the authenticating node, the STA an EAPOL-Keeplive request. Upon receiving such a message, the STA may return a Keeplive response.

A recommended format of the EAPOL-Keeplive request and Keeplive response may be as shown in FIG. 7.

In step 8, the STA may send out a DHCP Discover message requesting an IP address to the AC through the AP. STA IP address allocation may be achieved between the AC and the STA through the DHCP protocol.

Particularly, the step 8 forms no specific time sequence with the steps 1 to 7.

In step 9, the AC may determine that the STA has been authenticated successfully and the address allocation is successful, and send the BNG a subscriber connected announcement message.

When the BNG serves as a Radius Proxy network element between the AC and the AAA server, such a message may be a billing start message.

In step 10, after receiving the subscriber connected announcement message, the BNG may allow forwarding uplink and/or downlink data for the STA to access a network-side device.

Figure 10:
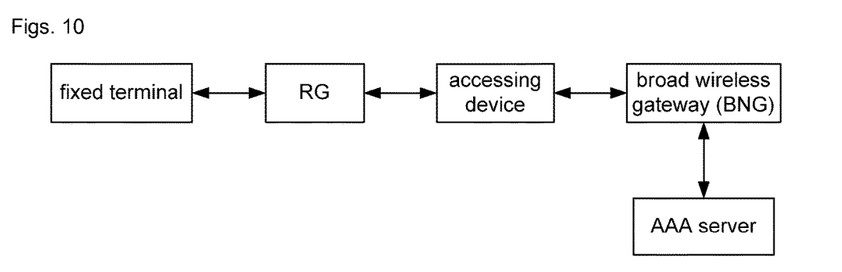
FIG. 10 is a topological diagram of a system for keeping an 802.1X access session alive according to a third embodiment herein.
Figure 11:
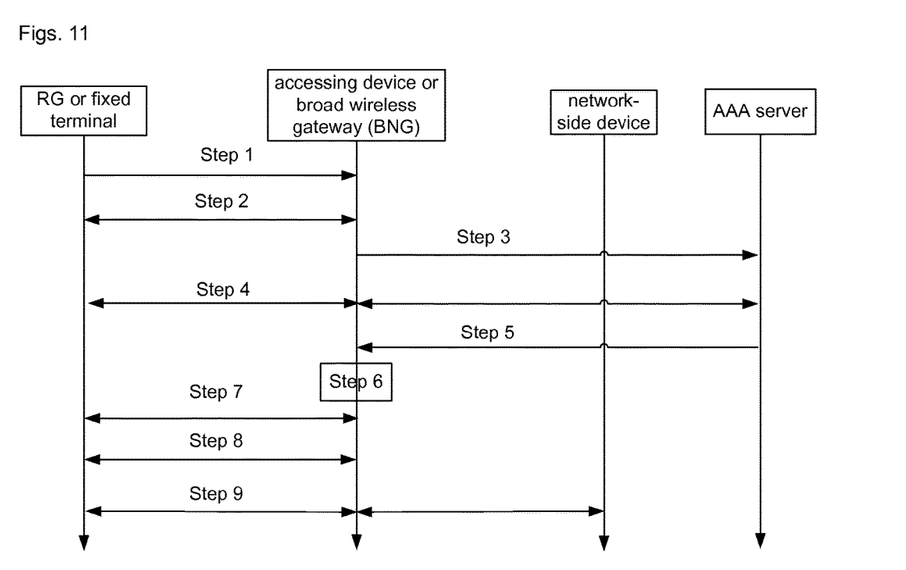
FIG. 11 is a flowchart of a method for keeping an 802.1X access session alive according to a third embodiment herein.

FIG. 10 is a topological diagram of a system for keeping an 802.1X access session alive according to a third embodiment herein. As shown in FIG. 10, in the third embodiment a Residential Gateway (RG) or a fixed terminal serves as an 802.1X client, and an access device or a BNG serves as an authenticating node, a flow thereof, as shown in FIG. 11, may include steps as follows.

In step 1, an RG or a fixed terminal may send an access device or a BNG information on a Keeplive enabling identifier and a recommended Keeplive period included in an extended EAPOL-Start-Announcement message.

A diagram of the extended EAPOL-Start-Announcement message is shown in FIG. 6.

In step 2, after receiving the EAPOL-Start-Announcement message sent by the RG or the fixed terminal, the accessing device or the BNG may extract therefrom, and save, the information on the recommended Keeplive period recommended by the RG or the fixed terminal; and send the RG or the fixed terminal an EAPOL-EAP-Request-Identity message. Upon receiving the EAPOL-EAP-Request-Identity message, the RG or the fixed terminal may send the accessing device or the BNG an EAPOL-EAP-Response-Identity message.

In step 3, the accessing device or the BNG may pack the EAPOL-EAP-Response-Identity message in a RADIUS protocol Access-Request, and send the Access-Request to an AAA server.

In step 4, the AAA server may negotiate an authentication mode with the RG or the fixed terminal. The AAA server may authenticate the RG or the fixed terminal.

In step 5, the AAA server may send the accessing device or the BNG an EAP-SUCCESS message indicating successful authentication or an EAP-FAILURE message indicating failed authentication packed in an Access-Accept/Reject message of a RADIUS protocol message.

If subscription information of a subscriber includes information on an authorized Keeplive period, the AAA server may send the accessing device or the BNG such information in the Access-Accept message.

In step 6, the accessing device or the BNG may determine, according to information on the recommended Keeplive period recommended by the RG or the fixed terminal, a local Keeplive period configured locally at the accessing device or the BNG as well as the authorized Keeplive period authorized for the RG or the fixed terminal by the AAA server, a Keeplive period of the accessing device or the BNG for the accessing device or the BNG to perform Keeplive over the RG or the fixed terminal.

In step 7, the accessing device or the BNG may send, according to the Keeplive period of the authenticating node, the RG or the fixed terminal an EAPOL-Keeplive request. Upon receiving such a message, the RG or the fixed terminal may return a Keeplive response. A format of the EAPOL-Keeplive request and Keeplive response may be as shown in FIG. 7.

In step 8, the RG or the fixed terminal may send the BNG a DHCP Discover message requesting an IP address. RG or fixed terminal IP address allocation may be achieved between the BNG and the RG or the fixed terminal through the DHCP protocol.

Particularly, the step 8 forms no specific time sequence with the steps 1 to 7.

In step 9, the accessing device or the BNG may determine that the RG or the fixed terminal has been authenticated successfully, and allow forwarding uplink and/or downlink data for the RG or the fixed terminal to access a network-side device.

Parts or steps herein may be implemented using a universal computing device, and may be integrated in a single computing device or distributed in a network formed by multiple computing devices. Optionally, they may be implemented using computing device executable program codes, and thus may be stored in a storage device and executed by a computing device. In some cases, the steps may be executed in an order different from that illustrated or described herein, or may each be made into an Integrated Circuit module. Multiple parts or steps herein may be implemented by being made into a single Integrated Circuit module. Thus, an embodiment herein is not limited to a specific combination of hardware and software.

Although elaborated as above, the disclosure is not limited thereto. Those skilled in the art may make various modifications according to the principle herein. Therefore, it is understood that any modification made according to the principle herein should be included in the scope of the present disclosure.

The invention claimed is:

1. A method for keeping an 802.1X access session alive, comprising:
determining, by an authenticating node, a Keeplive period of the authenticating node for an 802.1X client according to one of a recommended Keeplive period carried in an Extensible Authentication Protocol over Local Area Network (EAPOL)-Start-Announcement request or an announcement request and sent by the 802.1X client, a local Keeplive period configured locally at the authenticating node, and an authorized Keeplive period carried in an access-granted message and sent by an authenticating server for the 802.1X client;
sending, by the authenticating node, according to the Keeplive period of the authenticating node EAPOL-Keeplive request to the 802.1X client while the 802.1X client is connected to a network for determining whether the 802.1X client loses connection to the network abnormally;
determining, by the authenticating node, that the 802.1X client loses connection to the network abnormally, when the authenticating node does not receive, within a predetermined period of time at the authenticating node, a Keeplive response sent by the 802.1X client in response to the EAPOL-Keeplive request sent by the authenticating node to the 802.1X client;
determining, by the authenticating node, that the 802.1X client is connected to the network, when the authenticating node receives, within the predetermined period of time at the authenticating node, the Keeplive response sent by the 802.1X client in response to the EAPOL-Keeplive request sent by the authenticating node to the 802.1X client;
before sending, by the authenticating node to the 802.1X client, or by the 802.1X client to the authenticating node, the EAPOL-Keeplive request receiving, by the authenticating node, the EAPOL-Start-Announcement request sent by the 802.1X client and sending to the 802.1X client an EAPOL-EAP-Request-Identity message:
receiving, by the authenticating node, an EAPOL-EAP-Response-Identity message sent by the 802.1X client in response to the EAPOL-EAP-Request-Identity message, packing, by the authenticating node, the EAPOL-EAP-Response-Identity message into an Access-Request, and sending, by the authenticating node, the Access-Request to the authenticating server;
determining, by the authenticating server with the 802.1X client through the authenticating node, an authentication mode according to the Access-Request, and authenticating, by the authenticating server, the 802.1X client according to the authentication mode; and
packing, by the authenticating server, an authentication-succeeds result into an access-granted message, or an authentication-fails result into an access-refused message, and sending, by the authenticating server, the access-granted or access-refused message to the authenticating node, wherein during access authentication of the 802.1X client, when the EAPOL-Start-Announcement request sent by the 802.1X client does not comprise the recommended Keeplive period, packing, by the 802.1X client, the recommended Keeplive period into the announcement request, and sending, by the 802.1X client, the announcement request to the authenticating node, such that the authenticating node determines the Keeplive period of the authenticating node.

2. The method according to claim 1, further comprising:
while the 802.1X client is connected to the network, sending, by the 802.1X client according to a Keeplive period of the 802.1X client, to the authenticating node, an EAPOL-Keeplive request for determining whether the authenticating node is in an abnormal state;
when the 802.1X client receives, within a predetermined period of time at the 802.1X client, no Keeplive response sent by the authenticating node in response to the EAPOL-Keeplive request sent by the 802.1X client to the authenticating node, determining, by the 802.1X client, that the authenticating node is in an abnormal state; otherwise when the 802.1X client receives, within the predetermined period of time at the 802.1X client, a Keeplive response sent by the authenticating node in response to the EAPOL-Keeplive request sent by the 802.1X client to the authenticating node, determining that the authenticating node is in a normal state.

3. The method according to claim 2, further comprising:
before sending, by the authenticating node to the 802.1X client, or by the 802.1X client to the authenticating node, the EAPOL-Keeplive request, receiving, by the authenticating node, an EAPOL-Start-Announcement request sent by the 802.1X client, and sending to the 802.1X client an EAPOL-EAP-Request-Identity message;
receiving, by the authenticating node, an EAPOL-EAP-Response-Identity message sent by the 802.1X client in response to the EAPOL-EAP-Request-Identity message, packing, by the authenticating node, the EAPOL-EAP-Response-Identity message into an Access-Request, and sending, by the authenticating node, the Access-Request to the authenticating server;
determining, by the authenticating server with the 802.1X client through the authenticating node, an authentication mode according to the Access-Request, and authenticating, by the authenticating server, the 802.1X client according to the authentication mode; and
packing, by the authenticating server, an authentication-succeeds result into an access-granted message, or an authentication-fails result into an access-refused message, and sending, by the authenticating server, the access-granted or access-refused message to the authenticating node.

4. The method according to claim 3, wherein during access authentication of the 802.1X client, when the EAPOL-Start-Announcement request sent by the 802.1X client does not comprise the recommended Keeplive period, packing, by the 802.1X client, the recommended Keeplive period into an announcement request, and sending, by the 802.1X client, the announcement request to the authenticating node, such that the authenticating node determines the Keeplive period of the authenticating node.

5. The method according to claim 1, further comprising: acquiring, by the authenticating node, an authorization attribute for activating a Keeplive option in the received access-granted message by resolving the received access-granted message, and activating, by the authenticating node, according to the authorization attribute for activating the Keeplive option, a Keeplive option of an 802.1X client corresponding to a specified identity or service manage domain identifier, such that an 802.1X access session is kept alive.

6. The method according to claim 5, further comprising: before determining, by the authenticating node, the Keeplive period of the authenticating node for the 802.1X client,
resolving, by the authenticating node, the received EAPOL-Start-Announcement request or the received announcement request, and acquiring the recommended Keeplive period in the resolved message; and
resolving, by the authenticating node, the received access-granted message, and acquiring the authorized Keeplive period in the resolved access-granted message.

7. The method according to claim 5, wherein the Keeplive period of the 802.1X client is a default Keeplive period local to the 802.1X client.

8. The method according to claim 7, further comprising: acquiring, by the 802.1X client by resolving the Keeplive response received by the 802.1X client, a forced Keeplive period in the Keeplive response received by the 802.1X client, and adjusting, by the 802.1X client, the Keeplive period of the 802.1X client according to the forced Keeplive period.

9. A system for keeping an 802.1X access session alive, comprising:
an 802.1X client;
an authenticating node for access authentication: and an authenticating server, wherein the authenticating node is configured for:
determining a Keeplive period of the authenticating node for the 802.1X client according to one of a recommended Keeplive period carried in an Extensible authentication Protocol over Local Area Network (EAPOL)-Start-Announcement request or an announcement request and sent by the 802.1X client, a local Keeplive period configured locally at the authenticating node, and an authorized Keeplive period carried in an access-granted message and sent by an authenticating server for the 802.1X client;
sending, according to the Keeplive period of the authenticating node EAPOL-Keeplive request to the 802.1X client while the 802.1X client is connected to a network for determining whether the 802.1X client loses connection to the network abnormally;
determining that the 802.1X client loses connection to the network abnormally, when the authenticating node does not receive, within a predetermined period of time at the authenticating node, a Keeplive response sent by the 802.1X client in response to the EAPOL-Keeplive request sent by the authenticating node to the 802.1X client; and
determining that the 802.1X client is connected to the network, when the authenticating node receives, within the predetermined period of time at the authenticating node, the Keeplive response sent by the 802.1X client in response to the EAPOL-Keeplive request sent by the authenticating node to the 802.1X client;
before the authenticating node sends to the 802.1X client or the 802.1X client sends to the authenticating node, the EAPOL-Keeplive request receiving the EAPOL-Start-Announcement request sent by the 802.1X client and sending to the 802.1X client an EAPOL-EAP-Request-Identity message; receiving an EAPOL-EAP-Response-Identity message sent by the 802.1X client in response to the EAPOL-EAP-Request-Identity message, packing the EAPOL-EAP-Response-Identity message into an Access-Request and sending the Access-Request to the authenticating server;
wherein the authenticating server is configured for:
determining an authentication mode with the 802.1X client through the authenticating node according to the Access-Request, and authenticating the 802.1X client according to the authentication mode; and
packing an authentication-succeeds result into an access-granted message, or an authentication-fails result into an access-refused message, and sending the access-granted or access-refused message to the authenticating node; and
wherein the 802.1X client is further configured for:
during access authentication of the 802.1X client when the EAPOL-Start-Announcement request sent by the 802.1X client does not comprise the recommended Keeplive period, packing the recommended Keeplive period into the announcement request and sending the announcement request to the authenticating node, such that the authenticating node determines the Keeplive period of the authenticating node.

10. The system according to claim 9, wherein the 802.1X client is configured for:
while the 802.1X client is connected to the network, sending, according to a Keeplive period of the 802.1X client, to the authenticating node, an EAPOL-Keeplive request for determining whether the authenticating node is in an abnormal state; when the 802.1X client receives, within a predetermined period of time at the 802.1X client, no Keeplive response sent by the authenticating node in response to the EAPOL-Keeplive request sent by the 802.1X client to the authenticating node, determining that the authenticating node is in an abnormal state; otherwise when the 802.1X client receives, within the predetermined period of time at the 802.1X client, a Keeplive response sent by the authenticating node in response to the EAPOL-Keeplive request sent by the 802.1X client to the authenticating node, determining that the authenticating node is in a normal state.

11. The system according to claim 9, wherein the authenticating node is further configured for:
acquiring an authorization attribute for activating a Keeplive option in the received access-granted message by resolving the received access-granted message, and activating, according to the authorization attribute for activating the Keeplive option, a Keeplive option of an 802.1X client corresponding to a specified identity or service manage domain identifier, such that an 802.1X access session is kept alive.

12. The system according to claim 11, wherein the authenticating node is further configured for:

resolving the received EAPOL-Start-Announcement request or the received announcement request, and acquiring the recommended Keeplive period in the resolved message; and resolving the received access-granted message, and acquiring the authorized Keeplive period in the resolved access-granted message.

13. The system according to claim 11, wherein the Keeplive period of the 802.1X client is a default Keeplive period local to the 802.1X client.

14. The system according to claim 13, wherein the 802.1X client is further configured for:

acquiring, by resolving the Keeplive response received by the 802.1X client, a forced Keeplive period in the Keeplive response received by the 802.1X client, and adjusting the Keeplive period of the 802.1X client according to the forced Keeplive period.

15. An authenticating node, comprising a processor and a memory coupled to the processor which is configured to execute one or more programmed instructions comprising and stored in the memory to:

determine a Keeplive period of the authenticating node for an 802.1X client according to one of a recommended Keeplive period carried in an Extensible authentication Protocol over Local Area Network (EAPOL)-Start-Announcement request or an announcement request and sent by the 802.1X client, a local Keeplive period configured locally at the authenticating node, and an authorized Keeplive period carried in an access-granted message and sent by an authenticating server for the 802.1X client;

send, according to the Keeplive period of the authenticating node EAPOL-Keeplive request to the 802.1X client while the 802.1X client is connected to a network for determining whether the 802.1X client loses connection to the network abnormally;

determine that the 802.1X client loses connection to the network abnormally, when the authenticating node does not receive, within a predetermined period of time at the authenticating node, a Keeplive response sent by the 802.1X client in response to the EAPOL-Keeplive request sent by the authenticating node to the 802.1X client;

determine that the 802.1X client is connected to the network, when the authenticating node receives, within the predetermined period of time at the authenticating node, the Keeplive response sent by the 802.1X client in response to the EAPOL-Keeplive request sent by the authenticating node to the 802.1X client;

before sending to the 802.1X client the EAPOL-Keeplive request receive the EAPOL-Start-Announcement request sent by the 802.1X client and send to the 802.1X client an EAPOL-EAP-Request-Identity message;

receive an EAPOL-EAP-Response-Identity message sent by the 802.1X client in response to the EAPOL-EAP-Request-Identity message, pack the EAPOL-EAP -Response-Identity message into an Access-Request and send the Access-Request to the authenticating server;

receive the access-granted or access-refused message from the authentication server; and during access authentication of the 802.1X client receive the announcement request packing the recommended Keeplive period from the 802.1X client when the EAPOL-Start-Announcement request sent by the 802.1X client does not comprise the recommended Keeplive period.

16. An 802.1X client, comprising a processor and a memory coupled to the processor which is configured to execute one or more programmed instructions comprising and stored in the memory to:

receive an Extensible Authentication Protocol over LAN (EAPOL)-Keeplive request sent by an authenticating node according to a Keeplive period of the authenticating node for the 802.1X client while the 802.1X client is connected to a network, the EAPOL-Keeplive request being for determining whether the 802.1X client loses connection to the network abnormally;

send to the authenticating node, within a predetermined period of time at the authenticating node, a Keeplive response in response to the EAPOL-Keeplive request sent by the authenticating node, wherein the Keeplive period of the authenticating node for the 802.1X client is determined by the authenticating node according to one of a recommended Keeplive period carried in an Extensible Authentication Protocol over Local Area Network (EAPOL)-Start-Announcement request or an announcement request and sent by the 802.1X client, a local Keeplive period configured locally at the authenticating node, and an authorized Keeplive period carried in an access-granted message and sent by an authenticating server for the 802.1X;

before sending to the authenticating node the EAPOL-Keeplive request, send the EAPOL-Start-Announcement request to the authentication node and receive an EAPOL-EAP-Request-Identity message from the authentication node;

send an EAPOL-EAP-Response-Identity message to the authentication node in response to the EAPOL-EAP-Request-Identity message; and during access authentication of the 802.1X client when the EAPOL-Start-Announcement request does not comprise the recommended Keeplive period, pack the recommended Keeplive period into the announcement request and send the announcement request to the authenticating node.

* * * * *